United States Patent [19]

Nakajima et al.

[11] 4,423,349

[45] Dec. 27, 1983

[54] GREEN FLUORESCENCE-EMITTING MATERIAL AND A FLUORESCENT LAMP PROVIDED THEREWITH

[75] Inventors: Shigeharu Nakajima; Keiji Ichinomiya; Koichi Okada; Kaname Tsuchikura; Minoru Kashiwagi, all of Anan, Japan

[73] Assignee: Nichia Denshi Kagaku Co., Ltd., Anan, Japan

[21] Appl. No.: 279,561

[22] Filed: Jul. 1, 1981

[30] Foreign Application Priority Data

Jul. 16, 1980 [JP] Japan .................................. 55-97769
Aug. 22, 1980 [JP] Japan .................................. 55-116220

[51] Int. Cl.³ .......................... H01J 1/63; H01J 63/04
[52] U.S. Cl. .................................. 313/487; 313/484; 313/485; 313/486
[58] Field of Search ................ 313/484, 485, 486, 487

[56] References Cited

U.S. PATENT DOCUMENTS 4,208,611 6/1980 Watanabe et al. .................. 313/487
4,215,289 7/1980 De Hair et al. ..................... 313/486

Primary Examiner—Eugene R. La Roche
Assistant Examiner—Vincent De Luca
Attorney, Agent, or Firm—Oblon, Fisher, Spivak, McClelland & Maier

[57] ABSTRACT

A green light-emitting fluorescent material prepared from terbium-activated lanthanum cerium orthophosphate expressed by the structural formula:

$$La_x Tb_y Ce_z PO_4$$

where:
$x+y+z=1$
$0.05 < x < 0.35$
$0.05 < y < 0.3$
$0.6 < z < 0.9$ and a fluorescent lamp comprising said green light-emitting fluorescent material used alone or in combination with any other form of fluorescent material.

11 Claims, 2 Drawing Figures

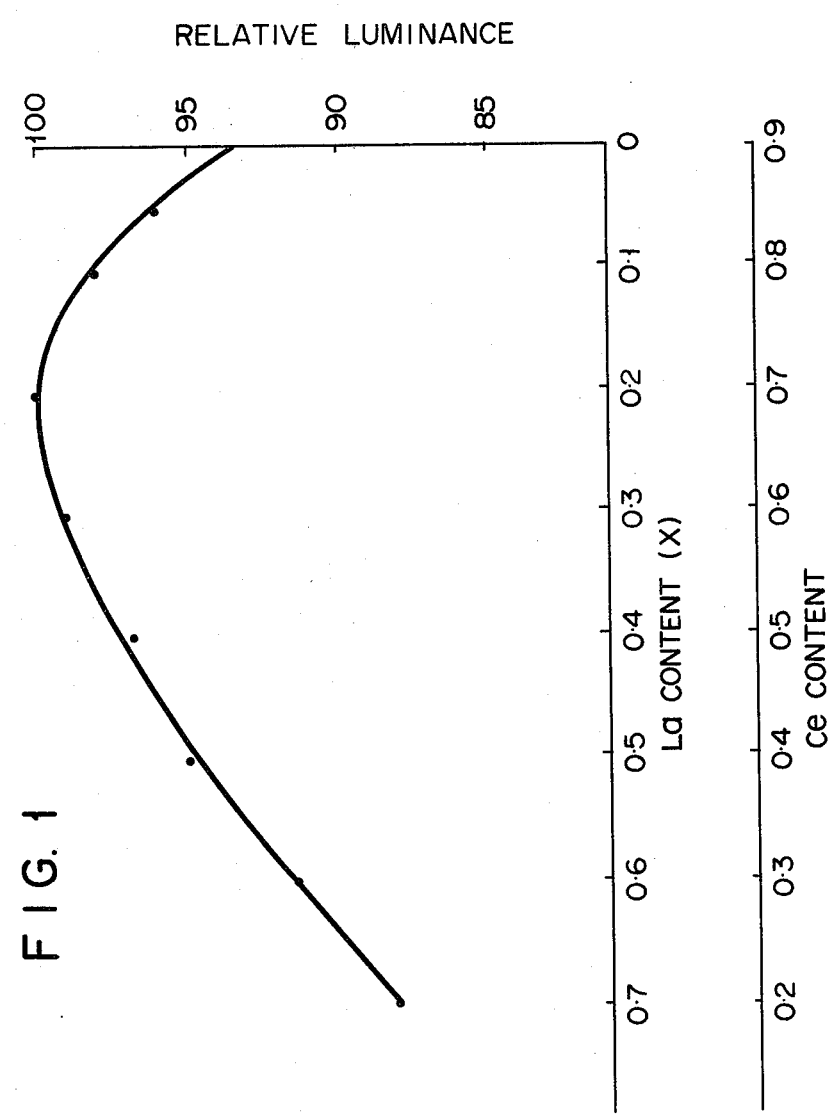

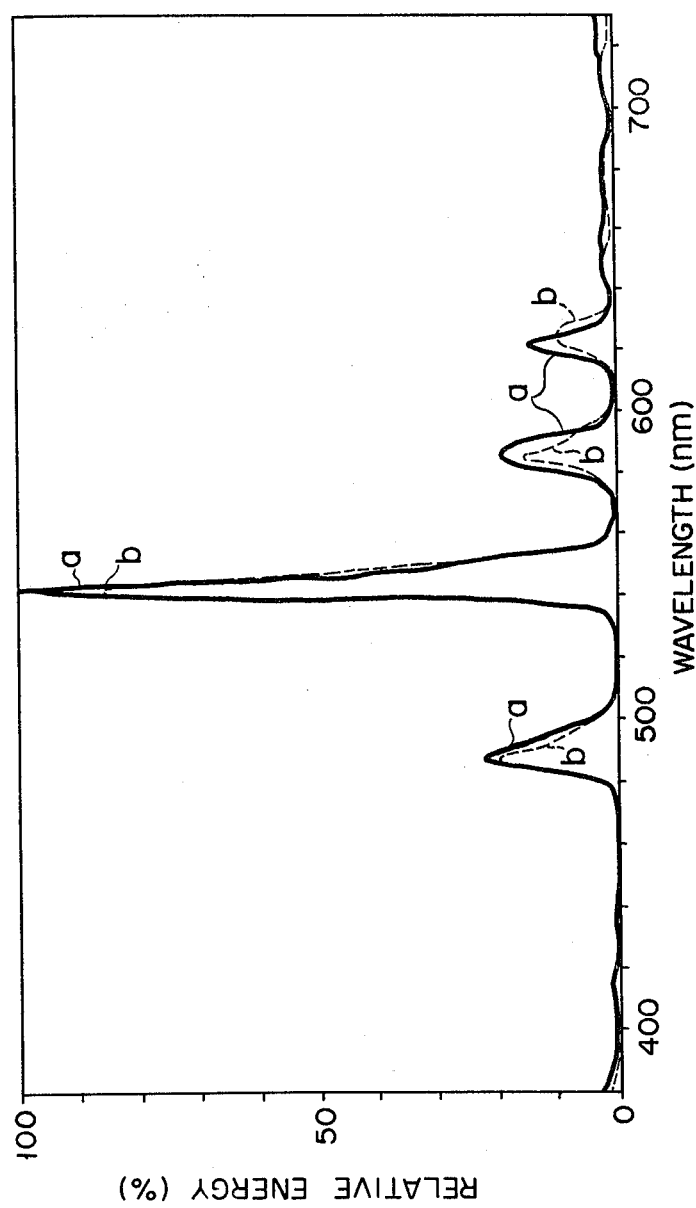

GREEN FLUORESCENCE-EMITTING MATERIAL AND A FLUORESCENT LAMP PROVIDED THEREWITH

BACKGROUND OF THE INVENTION

This invention relates to a fluorescent material prepared from lanthanum cerium orthophosphate activated by terbium (Tb) and a fluorescent lamp provided with said fluorescent material.

The conventional Deluxe type lamp whose color temperature ranges from the warm white to the daylight comprises a mixture of several kinds of fluorescent materials for the object of providing a flat spectral distribution similar to that of the sunlight. The prior art Delux type lamp based on this concept had a high color rendition, but had the drawback that a light flux unavoidably dropped. A large number of commercially available fluorescent lamps whose bright membrane was prepared from a fluorescent material of calcium halophosphate was intended to assure a high light flux at the sacrifice of color rendition. In recent years, however, demand is made for improvement of the quality of an illumination light. The problem at present is how to elevate color rendition while a high light flux is retained.

To resolve this problem, there has been proposed a fluorescent lamp comprising a 3-wavelength type assembly of fluorescent materials. This proposed fluorescent lamp is formed of an assembly of fluorescent materials respectively emitting a blue light having a wavelength of approximately 450 nm, a green light having a wavelength of approximately 540 nm and a red light having a wavelength of approximately 610 nm. Therefore, said proposed fluorescent lamp can elevate color rendition to as high a level as about Ra85, while maintaining about the same light flux as that of the aforesaid calcium halophosphate fluorescent material used with the commercially available fluorescent lamp.

The above-mentioned 3-wavelength type fluorescent lamp is already marketed. The most important one of the three fluorescent materials emitting blue, green and red lights is the type issuing a green light. The more efficient this green light-emitting material, the larger the volume of light fluxes obtained. At present, the development of this green light-emitting material is advanced.

The green light-emitting material is used alone with a green light-emitting fluorescent lamp of an electronic copying machine. In this case, such a fluorescent material is demanded and is little subject to deterioration with time in the luminosity, even when applied under the rigorous conditions in which intermittent illumination is carried out at high frequency.

Green light-emitting fluorescent materials known to date include (a) Tb-Ce activated magnesium aluminate, (b) Tb-Ce activated yttrium silicate, and (c) Tb-activated yttrium silicate. All these green light-emitting fluorescent materials have a highly efficient quality, but still are accompanied with some defects. The (a) fluorescent material whose matrix is aluminate has to be baked at an extremely high temperature as 1350° to 1500° C. to render it of high quality. Further, said matrix has to be grown by baking of long hours. Consequently, the quantity production of said (a) fluorescent material involves the provision of large scale equipment and the consumption of a large amount of cost.

With the (b) and (c) fluorescent materials, the content of terbium raises a problem. Since the matrix of the (b) and (c) is a silicate, the content of terbium should be as large as at least 30 mol% per molecular weight of said silicate. In other words, about 180 g of $Tb_4O_7$ should be used per kg of said silicate. Since this $Tb_4O_7$ is an expensive one among the commonly used rare earth materials, the above-mentioned fact unavoidably increases the cost of a fluorescent material and consequently harmfully affects the cost of the resultant fluorescent lamp.

SUMMARY OF THIS INVENTION

This invention has been accomplished in view of the above-mentioned circumstances and is intended to produce a green light-emitting fluorescent material which has a high luminosity and is little deteriorated in luminosity even when applied under rigorous conditions and offers great advantages in manufacture, and also provide a fluorescent lamp with which said green light-emitting fluorescent material is used alone or in combination with any other type of fluorescent material.

Namely, this invention provides lanthanum cerium orthophosphate which is activated by terbium (Tb) and is expressed by the following structural formula:

$$La_xTb_yCe_zPO_4 \qquad (I)$$

where:
$x+y+z=1$
$0.05<x<0.35$
$0.05<y<0.3$
$0.6<z<0.9$

Further, this invention provides a green light-emitting fluorescent lamp whose bright membrane contains a green light-emitting fluorescent material whose composition is expressed by the above-mentioned structural formula (I).

BRIEF DESCRIPTION OF THE DRAWINGS

FIG. 1 is a curve diagram showing the effect exerted on relative luminance by the ratio between the quantities of lanthanum and cerium used with a green light-emitting fluorescent material embodying this invention; and FIG. 2 is a spectral chart showing a spectrum of light rays emitted by the fluorescent material of the invention compared with that of the prior art fluorescent material.

DETAILED DESCRIPTION OF THE PREFERRED EMBODIMENT

As described above, a green light-emitting fluorescent material embodying this invention is formed of terbium-activated lanthanum cerium orthophosphate whose composition is expressed by the following structural formula:

$$La_xTb_yCe_zPO_4 \qquad (I)$$

where:
$x+y+z=1$
$0.05<x<0.35$
$0.05<y<0.3$
$0.6<z<0.9$

Where the quantity of Tb falls from 0.05 or increases over 0.3 in the above structural formula (I), then the luminance of the fluorescent material of this invention drops. Therefore, the quantity of Tb is preferred to range between 0.08 and 0.2.

To assure the high luminance of the subject fluorescent material, the quantity of La is also chosen to range from 0.05 to 0.35, or preferably from 0.12 to 0.30 in the above structural formula (I). The quantity of cerium constituting the matrix of the fluorescent material of the invention is chosen to range between 0.6 and 0.9 or preferably between 0.62 and 0.80.

An optimum range in which cerium and lanthanum are mixed will be apparent from the experimental data given in FIG. 1. The experimental data of FIG. 1 shows changes in the luminance of a green light-emitting fluorescent material ($Ce_{0.9} Tb_{0.1} PO_4$) in which the concentration of Tb is set at 0.1 mol, where the Ce was substituted by 0.05, 0.1, 0.2, 0.3, 0.4, 0.5, 0.6, and 0.7 mol of La in succession. As seen from FIG. 1, only substitution of Ce by 0.1 mol of La appreciably elevates the luminance of the subject green light-emitting fluorescent material. Where the quantity of the substitutent La approaches 0.2, said luminance rises to a maximum extent, and gradually falls, as the quantity of the substituent La increases in quantity. It is also confirmed that a high concentration of Ce indeed elevates the luminance of the subject fluorescent material; but with a composition position of Ce Tb $PO_4$ constituting the matrix of said fluorescent material, a high concentration of Ce rather conversely acts to cause a concentration quenching of said fluorescent material; and where the high concentration of Ce is partly substituted by a small amount of La, then the fluorescent material sends forth a maximum luminance.

The green light-emitting fluorescent material of the invention can be satisfactorily applied to a 3-wavelength type fluorescent lamp, where the blue component ranges between 16% and 28%
the green component ranges between 35% and 49%
the red component ranges between 26% and 38%, in case the color temperature lies near 5000K.

In the above-mentioned case, the blue light-emitting fluorescent material may be formed of at least one of the group consisting of europium (Eu) activated-strontium chloroapatite, europium (Eu)-activated strontium calcium chloroapatite and europium (Eu)-activated barium magnesium aluminate. The red light-emitting fluorescent material may be formed of europium (Eu) activated yttrium oxide.

Where the mixture of blue, green and red light-emitting materials having various color temperatures total 100 parts by weight, then it is possible to mix 0 to 70 parts by weight of a calcium halophosphate fluorescent material having the same color temperature as above-mentioned mixture. It is possible to add at least one of yttrium (Y), gadolinium (Gd) and lutecium (Lu) to the aforementioned composition of the green light-emitting fluorescent material of this invention.

This invention will be more apparent with reference to the examples which follow.

EXAMPLE 1

This example shows a process of manufacturing a green light-emitting fluorescent material having a composition of $Ce_{0.7} La_{0.2} Tb_{0.1} PO_4$. 200 ml of an aqueous solution containing 0.4 mol of ammonium bicarbonate ($NH_4 H CO_3$) is slowly dripped into 300 ml of an aqueous solution containing a chloride salt a total of 0.1 mol of rare earth elements such as $Ce_{0.07}$ mol, $La_{0.02}$ mol, and $Tb_{0.01}$ mol. The whole mass was reacted at a temperature around 70° C. The produced carbonate of these rare earth elements was easily filtered. After water washing, the precipitate was stirred in a 400 ml of water. The resultant slurry was slowly dripped into 300 ml of an aqueous solution containing 0.15 mol of phosphoric acid for reaction with stirring at 75° C., providing a phosphate of the coprecipitated rare earth elements. Analysis showed that the molar ratio between an element group lanthanide (Ln) and phosphorus (P) indicated 1:1. When dried at 100° C., the product already emitted a weak green fluorescent light.

The phosphate was heat-treated at 1150° C. for 75 minutes in a weak reductive atmosphere, providing a bright green light-emitting fluorescent material having the same composition as previously described.

EXAMPLE 2

This example shows another process of manufacturing a green light-emitting fluorescent material having a composition of $Ce_{0.7} La_{0.2} Tb_{0.1} PO_4$. 1025 g of cerium carbonate (containing 46.07% of Ce), 157 g of $La_2O_3$ and 90 g of $Tb_4O_7$ were dissolved in HCl. Water was added to provide an aqueous solution of 10 l. 2000 g of oxalic acid ($H_2C_2O_4.2H_2O$) was dissolved in water to provide an aqueous solution of 10 l. Both solutions were reacted at 80° C. The produced oxalate of coprecipitated rare earth elements was decomposed at 800° C., providing 800 g of oxide. 623 g of $(NH_4)HPO_4$ was added to the oxide, followed by thorough mixing. When the mixture was decomposed at 700° C., a phosphate of the rare earth elements was obtained. The phosphate was crushed and baked for 4 hours at 1200° C. in a reductive atmosphere, producing a fluorescent material having the above-mentioned composition. Where, at the time of baking in a reductive atmosphere, several percent of an oxide of boron or a flux of oxyacid salt series, for example, ammonium borate $((NH_4)_2O.5-B_2O_3.8H_2O)$ was added, then reaction was promoted, increasing the luminance of the subject fluorescent material by 4 to 5%.

EXAMPLE 3

Europium (Eu)-activated strontium calcium chloroapatite was used as a blue light-emitting fluorescent material. Europium (Eu)-activated yttrium oxide was used as a red light-emitting material. The Tb activated lanthanum cerium orthophosphate obtained in Example 1 was used as a green light-emitting fluorescent material. A mixture of proper amounts of these three fluorescent materials was applied to provide a FL-40S lamp. An optimum mixing ratio was determined from the result of measuring the chromaticity (x, y). In this case, the mixing ratio is affected by the luminance, particle size and coated amount of the respective fluorescent materials. Therefore, a certain range should be allowed for said mixing ratio. The mixing ratio, chromaticity, light flux (zero time) and color rendition (Ra) determined in the present experiments when a color temperature indicated 5000° K are set forth in Table 1 below.

TABLE 1

| % by weight | | | Chromaticity | Color Temperature | Light Flux (lm) | Ra | Coated Amount (g) |
|---|---|---|---|---|---|---|---|
| Blue | Green | Red | x 0.343 | 5100° K. | 3340 | 83 | 5.1 |
| 22 | 44 | 34 | y 0.358 | | | | |

EXAMPLE 4

This example relates to the case where an attempt was made to decrease the cost of a fluorescent material by adding an inexpensive halophosphate fluorescent material (concrete example: $Ca_{10}(PO_4)_6FCl:Sb\, Mn$). In this case, 50 parts by weight of a halophosphate fluorescent material having a color temperature of 5000° K. substantially the same as that given in Table 1 above was mixed with 100 parts by weight of the mixture of the blue, green and red fluorescent materials of Table 1 above. Therefore, the added amount of the halophosphate fluorescent material accounted for 33% of the total weight of the fluorescent materials.

TABLE 2

| % by weight | | | | Chromaticity | Color Temperature | Light Flux (lm) | Ra | Coated Amount (g) |
|---|---|---|---|---|---|---|---|---|
| Blue | Green | Red | Halo-phosphate | x 0.346 | 5000° K. | 3310 | 80 | 5.5 |
| 15 | 30 | 22 | 33 | y 0.365 | | | | |

As seen from Table 2 above, the addition of the halophosphate fluorescent material to the extent given therein did not result in noticeable changes in the light flux and color rendition of the resultant fluorescent lamp.

EXAMPLE 5

An inexpensive halophosphate fluorescent material (the same as that of Example 4) was not directly mixed with the mixture of the three blue, green and red light-emitting fluorescent materials of Example 4. The bright membrane of a fluorescent lamp was provided by first coating the halophosphate fluorescent material on the inside of the glass envelope and then the mixture of said three fluorescent materials on the halophosphate fluorescent material.

TABLE 3

| % by weight | | | | Chromaticity | Color Temperature | Light Flux (lm) | Ra | Coated Amount (g) |
|---|---|---|---|---|---|---|---|---|
| Blue | Green | Red | Halo-phosphate | x 0.346 | 5000° K. | 3320 | 81 | 5.5 |
| 15 | 30 | 22 | 33 | y 0.363 | | | | |

The above-mentioned Examples 3–5 show that a fluorescent lamp provided with fluorescent materials having a color temperature of 5000° K. indicated a larger light flux than 3300 lm and a higher degree of color rendition than 80.

Application of a green light emitting fluorescent material formed of Tb activated lanthanum cerium orthophosphate provided an excellent 3-wavelength type fluorescent lamp exhibiting a satisfactory light flux and a high degree of color rendition.

EXAMPLE 6

This example relates to the case where comparison is made between a green light-emitting fluorescent lamp for an electronic copying machine which consists of a prior art green light-emitting fluorescent material and a similar green light-emitting fluorescent lamp for the electronic copying machine which is formed of a green light-emitting fluorescent material embodying this invention.

The green light-emitting fluorescent material embodying the invention was prepared from $La_{0.2}Ce_{0.7}Tb_{0.1}PO_4$. The experiment of Example 6 used $Zn_2SiO_4:Mn$ and $Y_2SiO_5:CeTb$ constituting the fluorescent material of a green light-emitting fluorescent lamp for the electronic copying material, and also a green light-emitting fluorescent material embodying this invention which was prepared from $La_{0.2}Ce_{0.7}Tb_{0.1}PO_4$. Each of these fluorescent materials was applied as a bright membrane in a fluorescent lamp measuring 25 mm in diameter and 436 mm in length and consuming power of 30 W. The tested fluorescent lamp was intermittently illuminated at an interval of 10 seconds, measuring changes with time in the luminosity or candella (Cd) of the tested fluorescent lamp. The results are set forth in Table 4 below.

TABLE 4

| Fluorescent Material | 0 Hour (Cd) | 100 Hours (Cd) |
|---|---|---|
| $Zn_2SiO_4:Mn$ | 345 (approximately 100%) | 301 (approximately 87.5%) |
| $Y_2SiO_5:CeTb$ | 414 (100%) | 358 (86.4%) |
| $(La_{0.2}Ce_{0.7}Tb_{0.1})PO_4$ | 426 (100%) | 392 (92.8%) |

EXAMPLE 7

This example relates to the case where comparison was made between the fluorescent material $La_{0.2}Ce_{0.7}Tb_{0.1}$ of this invention applied as a bright membrane on the inside of the ordinary FL40S type 40 W fluorescent lamp measuring 32 mm in diameter and 1214 mm in length and filled with argon gas, and the conventional fluorescent material $Zn_2SiO_4:Mn$ and $MgO\cdot6Al_2O_3:CeTb$ similarly used as a bright membrane on the inside of the same type of fluorescent lamp. The luminosity or light flux (lumen) of the tested fluorescent lamps was determined, the results being set forth in Table 5 below.

TABLE 5

| | Fluorescent Material | 0 Hour (lm) | 100 Hours (lm) | 1000 Hours (lm) |
|---|---|---|---|---|
| This Invention | La:Ce:Tb | | | |
| | 0.2:0.75:0.05 | 4241 (100) | 4056 (95.6) | 3984 (93.9) |
| | 0.2:0.70:0.10 | 4705 (100) | 4573 (97.1) | 4423 (94.0) |
| | 0.2:0.65:0.15 | 4662 (100) | 4522 (96.9) | 4354 (93.3) |
| | 0.2:0.60:0.20 | 4634 (100) | 4490 (96.8) | 4407 (95.1) |
| | 0.05:0.85:0.1 | 4338 (100) | 4190 (96.5) | 4012 (92.4) |
| | 0.10:0.80:0.1 | 4474 (100) | 4344 (97.0) | 4165 (93.0) |
| | 0.15:0.75:0.1 | 4587 (100) | 4449 (96.9) | 4302 (93.7) |
| | 0.25:0.65:0.1 | 4643 (100) | 4517 (97.2) | 4336 (93.3) |
| | 0.30:0.60:0.1 | 4592 (100) | 4450 (96.9) | 4366 (95.0) |
| Control | 0.2:0.50:0.30 | 4079 (100) | 3842 (94.1) | 3691 (90.4) |
| | 0.2:0.40:0.40 | 3867 (100) | 3645 (94.2) | 3495 (90.3) |
| | 0:0.90:0.1 | 4154 (100) | 3900 (93.8) | 3721 (89.5) |
| | 0.40:0.50:0.1 | 4206 (100) | 3999 (95.0) | 3856 (91.6) |
| This Invention | $La_{0.1}Y_{0.1}Ce_{0.7}Tb_{0.1}PO_4$ | 4545 (100) | 4367 (96.0) | 4185 (92.0) |

TABLE 5-continued

| | Fluorescent Material | 0 Hour (lm) | 100 Hours (lm) | 1000 Hours (lm) |
|---|---|---|---|---|
| vention | $La_{0.1}Gd_{0.1}Ce_{0.7}Tb_{0.1}PO_4$ | 4573 (100) | 4426 (96.7) | 4266 (93.2) |
| | $La_{0.1}Lu_{0.1}Ce_{0.7}Tb_{0.1}PO_4$ | 4516 (100) | 4330 (95.8) | 4186 (92.6) |
| Prior Art | $Zn_2SiO_4:Mn$ | 4350 (100) | 4045 (92.9) | 3271 (75.1) |
| | $MgO.6Al_2O_3:CeTb$ | 4711 (100) | 4569 (96.9) | 4395 (93.2) |

EXAMPLE 8

This example relates to the case where comparison was made between a spectrum of light rays emitted by the fluorescent material $(Ce_{0.7} La_{0.2} Tb_{0.1}) PO_4$ of this invention when excited by a wavelength of 253 nm and a spectrum of light rays emitted by the conventional fluorescent material $MgO.5Al_2O_3.Al(Ce_{0.67} Tb_{0.33})O_3$ when excited in the same manner. The results are set forth in FIG. 2. In this FIG. 2, curve "a" represents the fluorescent material of this invention and curve "b" denotes the above-mentioned conventional fluorescent material. It is seen from FIG. 2 that the fluorescent material of this invention has a higher luminance than the conventional type. When used as a green light-emitting component of an elongated fluorescent lamp of high luminosity and color rendition, the fluorescent material of this invention is produced by being baked at a temperature of about 1100° C., eliminating the necessity of applying a high temperature (1350°–1500° C.) as is applied in the baking of the conventional fluorescent material, offering great advantages in manufacture. Further merit of the fluorescent material of the invention is that the material cost of the fluorescent lamp is reduced, because the optimum concentration of an activating agent Tb used with the present fluorescent material prepared from lanthanum cerium orthophosphate is preferred to be about 10 mol% per molecular weight of the whole of the finally produced fluorescent material; the metal component of said fluorescent material consists of La having a larger atomic weight than Y; and consequently only about 80 g of terbium oxide ($Tb_4O_7$) has to be used as an activating agent in the manufacture of, for example, 1 kg of a fluorescent material, offering economic advantage.

What we claim is:

1. A green light-emitting fluorescent material prepared from terbium activated lanthanum cerium orthophosphate and expressed by formula (I):

$$La_xTb_yCe_zPO_4 \qquad (I)$$

where:
$x+y+z=1$
$0.05<x<0.35$
$0.05<y<0.3$
$0.6<z<0.9$.

2. The green light-emitting fluorescent material according to claim 1, wherein the term z given in formula (I) is 0.62 to 0.80; the term y is 0.08 to 0.20; and the term x is 0.12 to 0.30.

3. The green light-emitting fluorescent material according to claim 1 or 2, which comprises at least one of yttrium, gadolinium and lutecium.

4. A 3-wavelength type fluorescent lamp which is provided with 16 to 28% of a blue light-emitting fluorescent material 35 to 49% of a green light-emitting fluorescent material 26 to 38% of a red light-emitting fluorescent material wherein said fluorescent lamp is chosen to have a color temperature around 5000° K., and in which the green light-emitting fluorescent material is prepared from terbium-activated lanthanum cerium orthophosphate expressed by the formula:

$$La_xTb_yCe_zPO_4 \qquad (I)$$

where:
$x+y+z=1$
$0.05<x<0.35$
$0.05<y<0.3$
$0.6<z<0.9$.

5. The fluorescent lamp according to claim 4, wherein the term z given in formula (I) is 0.62 to 0.80; the term y is 0.08 to 0.20; and the term x is 0.12 to 0.30.

6. The fluorescent lamp according to claim 4 or 5, wherein the green light-emitting fluorescent material contains at least one of yttrium, gadolinium and lutecium.

7. The fluorescent lamp according to claim 4 or 5, which is further provided with less than 70 parts by weight of the calcium halophosphate fluorescent material based on the total 100 parts by weight of the blue, green and red lights-emitting fluorescent materials.

8. A fluorescent lamp used with an electronic copying machine, whose inside is coated with a green light-emitting fluorescent material prepared from terbium-activated lanthanum cerium orthophosphate expressed by the formula:

$$La_xTb_yCe_zPO_4 \qquad (I)$$

where:
$x+y+z=1$
$0.05<x<0.35$
$0.05<y<0.3$
$0.6<z<0.9$.

9. A green light-emitting fluorescent material of the formula:

$$La_xTb_yCe_zPO_4 \qquad (I)$$

where $x+y+z=1$ and where z is 0.62 to 0.80, y is 0.08 to 0.20, and x is 0.12 to 0.30.

10. The fluorescent lamp according to claim 8 or 9, which is further provided with at least one of yttrium, gadolinium and lutecium.

11. A mercury vapor discharge lamp, which comprises a single or a plurality of bright membranes prepared from a plurality of fluorescent materials, whose color temperature ranges from 2800° to 7000° K., and wherein a green light-emitting fluorescent material is prepared from terbium activated lanthanum cerium orthophosphate expressed by the formula:

$$La_xTb_yCe_zPO_4 \qquad (I)$$

where:
$x+y+z=1$
$0.05<x<0.35$
$0.05<y<0.3$
$0.6<z<0.9$.

* * * * *